(12) United States Patent
Wyle et al.

(10) Patent No.: US 8,655,075 B2
(45) Date of Patent: Feb. 18, 2014

(54) OPTICAL CHARACTER RECOGNITION VERIFICATION AND CORRECTION SYSTEM

(75) Inventors: David A. Wyle, Corona Del Mar, CA (US); William W. Hosek, Laguna Niguel, CA (US)

(73) Assignee: SurePrep, LLC, Newport Beach, CA (US)

( * ) Notice: Subject to any disclaimer, the term of this patent is extended or adjusted under 35 U.S.C. 154(b) by 54 days.

(21) Appl. No.: 13/542,345

(22) Filed: Jul. 5, 2012

(65) Prior Publication Data
US 2014/0010452 A1    Jan. 9, 2014

(51) Int. Cl.
G06K 9/18    (2006.01)

(52) U.S. Cl.
USPC ................................... 382/182; 382/218

(58) Field of Classification Search
USPC ................................... 382/182, 218
See application file for complete search history.

(56) References Cited

U.S. PATENT DOCUMENTS

| 5,963,659 | A | * | 10/1999 | Cahill et al. | 382/139 |
| 7,013,045 | B2 | | 3/2006 | Sommer et al. | |
| 7,529,408 | B2 | * | 5/2009 | Vohariwatt et al. | 382/180 |
| 7,565,312 | B1 | | 7/2009 | Shaw et al. | |
| 7,570,842 | B2 | | 8/2009 | Suenaga et al. | |
| 7,836,394 | B2 | * | 11/2010 | Linder | 715/234 |
| 7,840,891 | B1 | | 11/2010 | Yu et al. | |
| 8,050,451 | B2 | * | 11/2011 | Brundage et al. | 382/100 |
| 8,392,472 | B1 | * | 3/2013 | Gupta et al. | 707/804 |
| 8,520,885 | B2 | * | 8/2013 | Tanabe | 381/396 |
| 2003/0231344 | A1 | | 12/2003 | Fast | |
| 2006/0028520 | A1 | * | 2/2006 | Vonwiller et al. | 347/100 |
| 2010/0074509 | A1 | | 3/2010 | Laaser et al. | |
| 2010/0161460 | A1 | | 6/2010 | Vroom et al. | |

* cited by examiner

Primary Examiner — Gregory M Desire
(74) Attorney, Agent, or Firm — Snell & Wilmer LLP

(57) ABSTRACT

A system for verifying and correcting errors after translation of printed text into machine-readable text. The system includes a memory for storing formulas defining relationships between data fields. A processor evaluates the formulas according to data values associated with the data fields to determine whether the formulas evaluate as truthful statements. The processor marks the data fields of the formulas as unverified or as verified based upon this evaluation. The system also uses the processor to calculate a determined value for data fields in an attempt to correct errors in the translation of the printed text into machine-readable text. If different determined values are calculated for the same data field, based upon different formulas, the data field is marked as uncertain. The system iterates based upon the marking of the data fields of the formulas as verified or unverified and as uncertain or not uncertain.

20 Claims, 9 Drawing Sheets

RULE OF FORM 1040 : SUM OF LINES 7-21 = LINE 22 — 301

| AMOUNTS ON 1040 DOCUMENT | | |
|---|---|---|
| FORM 1040 | DESCRIPTION | AMOUNT |
| LINE 7 | WAGES | $ 10,000.00 |
| LINE 8A | TAXABLE INTEREST | $ 800.00 |
| LINE 9A | TAXABLE DIVIDEND | $ 700.00 |
| LINE 13 | BUSINESS INCOME (LOSS) | $ 5,500.00 |
| LINE 15 | IRA DISTRIBUTIONS | $ 1,800.00 |
| LINE 17 | RENTAL REAL ESTATE, PARTNERSHIP. ATTACH SCHEDULE E | $ 3,300.00 |
| LINE 18 | FARM INCOME (LOSS) | $ 2,200.00 |
| LINE 19 | UNEMPLOYMENT COMPENSATION | $ - |
| LINE 20 | SOCIAL SECURITY BENEFITS | $ 3,185.00 |
| LINE 21 | OTHER INCOME | $ 200.00 |
| LINE 22 | COMBINE THE AMOUNTS FROM LINE 7 THROUGH 21. TOTAL INCOME | $ 27,685.00 |

| OCR READ AMOUNTS ON 1040 DOCUMENT | | | |
|---|---|---|---|
| FORM 1040 | DESCRIPTION | AMOUNT | |
| LINE 7 | WAGES | $ 10,000.00 | UNVERIFIED |
| LINE 8A | TAXABLE INTEREST | $ 200.00 | UNVERIFIED |
| LINE 9A | TAXABLE DIVIDEND | $ 700.00 | UNVERIFIED |
| LINE 13 | BUSINESS INCOME (LOSS) | $ 5,500.00 | UNVERIFIED |
| LINE 15 | IRA DISTRIBUTIONS | $ 1,800.00 | UNVERIFIED |
| LINE 17 | RENTAL REAL ESTATE, PARTNERSHIP. ATTACH SCHEDULE E | $ 3,300.00 | UNVERIFIED |
| LINE 18 | FARM INCOME (LOSS) | $ 2,200.00 | UNVERIFIED |
| LINE 19 | UNEMPLOYMENT COMPENSATION | $ - | |
| LINE 20 | SOCIAL SECURITY BENEFITS | $ 3,185.00 | UNVERIFIED |
| LINE 21 | OTHER INCOME | $ 200.00 | UNVERIFIED |
| LINE 22 | COMBINE THE AMOUNTS FROM LINE 7 THROUGH 21. TOTAL INCOME | $ 27,685.00 | UNVERIFIED |

| RULE : SUM OF LINES 7-21 = LINE 22 |
|---|
| 27085 = 27685 |

| RESULT |
|---|
| FAIL |

| UNMATCHED ONE TO ONE |
|---|
| FORM 4562 LINE 28 : DEPRECIATION = SCHEDULE C LINE 13 DEPRECIATION. |
| FORM 4562 LINE 28 : DEPRECIATION = SCHEDULE E LINE 20 DEPRECIATION. |
| FORM 4562 LINE 28 : DEPRECIATION = SCHEDULE F LINE 16 DEPRECIATION. |

← 421

422 →

| SCHEDULE C | DESCRIPTION | AMOUNT | |
|---|---|---|---|
| | XYZ COMPANY | | |
| LINE 13 | DEPRECIATION | $ | 400.00 | ← 423 — VERIFIED
| | DEPLETION | $ | 800.00 |
| | | | |
| | TOTAL BUSINESS EXPENSES | $ | 1,200.00 |
| | | | |

424 →

| FORM 4562 | DESCRIPTION | AMOUNT | |
|---|---|---|---|
| LINE 28 | DEPRECIATION | $ | 500.00 | ← 425
| | | | |
| | TOTAL DEPRECIATION | $ | 500.00 |
| | | | |

426 →

| FORM 4562 | DESCRIPTION | AMOUNT | |
|---|---|---|---|
| LINE 28 | DEPRECIATION | $ | 400.00 | ← 427 — VERIFIED
| | | | |
| | TOTAL DEPRECIATION | $ | 400.00 |
| | | | |

428 →

| FORM 4562 | DESCRIPTION | AMOUNT | |
|---|---|---|---|
| LINE 28 | DEPRECIATION | $ | 600.00 | ← 429
| | | | |
| | TOTAL DEPRECIATION | $ | 600.00 |
| | | | |

UNMATCHED ONE TO MANY
SCHEDULE C LINE 30 : EXPENSES FOR BUSINESS USE OF HOME = SUM OF FORM 8829 LINE 35 : ALLOWABLE EXPENSES FOR BUSINESS USE OF HOME. — 431

432:

| SCHEDULE C | DESCRIPTION | AMOUNT | |
|---|---|---|---|
| | ABC COMPANY | | |
| | DEPRECIATION | $ | 400.00 |
| | DEPLETION | $ | 800.00 |
| LINE 30 | ALLOWABLE EXPENSES FOR BUSINESS USE OF HOME. | $ | 1,600.00 ← VERIFIED CASE #1 (433) |
| | TOTAL BUSINESS EXPENSES | $ | 2,800.00 |

434:

| SCHEDULE C | DESCRIPTION | AMOUNT | |
|---|---|---|---|
| | XYZ COMPANY | | |
| | DEPRECIATION | $ | 400.00 |
| | DEPLETION | $ | 800.00 |
| LINE 30 | ALLOWABLE EXPENSES FOR BUSINESS USE OF HOME. | $ | 1,800.00 ← VERIFIED CASE #2 (435) |
| | TOTAL BUSINESS EXPENSES | $ | 3,000.00 |

436:

| FORM 8829 | DESCRIPTION | AMOUNT | |
|---|---|---|---|
| LINE 35 | ALLOWABLE EXPENSES FOR BUSINESS USE OF HOME. | $ | 900.00 ← VERIFIED (437) |
| | TOTAL EXPENSES FOR BUSINESS USE OF HOME | $ | 900.00 |

438:

| FORM 8829 | DESCRIPTION | AMOUNT | |
|---|---|---|---|
| LINE 35 | ALLOWABLE EXPENSES FOR BUSINESS USE OF HOME. | $ | 700.00 ← VERIFIED (439) |
| | TOTAL EXPENSES FOR BUSINESS USE OF HOME | $ | 700.00 |

} CASE #1

440:

| FORM 8829 | DESCRIPTION | AMOUNT | |
|---|---|---|---|
| LINE 35 | ALLOWABLE EXPENSES FOR BUSINESS USE OF HOME. | $ | 1,800.00 ← VERIFIED CASE #2 (441) |
| | TOTAL EXPENSES FOR BUSINESS USE OF HOME | $ | 1,800.00 |

FIG. 4D

OPTICAL CHARACTER RECOGNITION VERIFICATION AND CORRECTION SYSTEM

BACKGROUND

1. Field

The present invention relates generally to software or systems utilizing optical character recognition and improvements thereof. More particularly, the present invention relates to software or systems for determining or correcting errors in electronic files generated using optical character recognition and improvements thereof.

2. Description of the Related Art

As society becomes increasingly computerized in nature and as physical storage space for many businesses is increasingly filled to capacity, there has been an amplified effort for many industries to generate and store electronic copies of previously created hardcopy documents. Such electronic copies permit far cheaper and easier backup and management than their physical counterparts and electronic files exhibit greatly reduced risk of damage or loss over time. What might have once taken up entire storage facilities or warehouses for document retention purposes may now be easily stored on a few compact hard disk drives at a fraction of the expense and physical storage space required. In addition, electronic documents also allow for much easier transmittal or reproduction of the documents, allowing for improved remote access to the files over private or public networks. Moreover, categorizing, editing, computing, manipulating, and retrieval of such documents can searched comparably quicker and easier via electronic copies.

Optical character recognition ("OCR") has become a popular process for the conversion of scanned paper documents having handwritten, typewritten or printed text into electronic files since it not only provides for a readable electronic copy (i.e., an image) of the paper copy, but also attempts to translate the text of the paper copy into a machine-readable format. Thus, instead of an electronic copy acting only as an image interpretable by a human eye, machine-encoded text can be searched or otherwise manipulated or computed upon electronically. A human being may no longer be necessary to read or otherwise interpret an electronic document for determining its contents or for searching particularly desired features; rather, a computer can be used to perform the same tasks at a much quicker and more efficient rate. These features have made OCR a widely used form of data entry in recent times.

Unfortunately, OCR can be unreliable when attempting to decipher handwriting, fonts, or degraded documents or printing that is not easily identifiable. This is particularly problematic when documents contain numerals or other information that OCR processes cannot readily determine based upon context of other, surrounding wording. For example, OCR processes performed upon tax forms or other financial documentation or statements run a substantial risk of misinterpretation due their almost entirely numerical nature. Even a single error in the determination of a number can result in vastly different financial information. Thus, although OCR is implemented to help save time in searching or retaining documents, significant human manpower is conventionally employed in order to crosscheck and verify the accuracy of documents that undergo the OCR process.

Currently, a variety of solutions have been proposed for aiding in accurate OCR capture. One such process utilizes multiple passes of a document through different OCR technologies or employs human operators to determine if there exists any variance between the multiple interpretations. Another process involves creating relationships between data entries during the OCR process across a wide number of electronic documents and establishing confidence levels in subsequent OCR accuracy based upon these generated relationships. These techniques require substantial time and/or a large plurality of prior OCR'ed documents in order to effectively operate.

Ideally, a system or method could be used to electronically verify the accuracy of the OCR process for electronic documentation. The system or method would ideally operate automatically or with a minimum of human intervention in order to minimize employee expenses and human errors. The system or method would ideally be able to operate to a high degree of certainty in verifying such documents and be capable of operating upon current documentation without requiring comparison to previous corresponding documentation for confidence in OCR accuracy. In addition, the system or method would ideally be able to verify OCR errors in documents that are particularly error prone in the OCR process, such as financial statements or tax forms.

SUMMARY

A system or method for verifying and/or correcting data field values after translation of document text into machine-readable text is described. In one embodiment, a method for verifying optical character recognition data using a processor and a memory may include the steps of storing a first data value in the memory, the first data value associated with a first data field, storing a second data value in the memory, the second data value associated with a second data field, marking, using the processor, the first data field and the second data field as not uncertain, storing a formula in the memory, the formula defining a relationship between the first data field and the second data field, applying, using the processor, the formula to the first data value and the second data value for determining whether the formula evaluates as true or not true, marking, using the processor, the first data field as unverified and the second data field as unverified if the formula evaluates as not true, calculating, using the processor, a determined value for the first data field using the formula if the first data field is marked as unverified and if the first data field is marked as not uncertain and marking, using the processor, the first data field as uncertain if the determined value for the first data field does not match a previous determined value for the first data field.

In another embodiment, a method for verifying optical character recognition data using a processor may include the steps of receiving, at the processor, a data value corresponding to a first data field, the data value of the first data field generated via optical character recognition, receiving, at the processor, a data value corresponding to a second data field, the data value of the second data field generated via optical character recognition, receiving, at the processor, a data value corresponding to a third data field, the data value of the third data field generated via optical character recognition, setting, using the processor, the first data field, the second data field and the third data field as not uncertain, defining a first rule for relating the first data field to the second data field, defining a second rule for relating the first data field to the third data field, determining, using the processor, if the first rule is true based on the data value corresponding to the first data field and the data value corresponding to the second data field, setting, using the processor, the first data field and the second data field as verified if the first rule is true or as unverified if the first rule is not true, determining, using the processor, if the second rule is true based on the data value corresponding to the first data field and the data value corresponding to the third data field, setting, using the processor, the first data field and the third data field as verified if the second rule is true or as unverified if the second rule is not true, calculating, using the processor, a first determined value for the first data field based on the first rule if the first data field is set as unverified, the second data field is set as verified and the first data field and the second data field are set as not uncertain, calculating, using the processor, a second determined value for the first data field based on the second rule if the first data field is set as unverified, the third data field is set as verified and the first data field and the third data field are set as not uncertain and setting, using the processor, the first data field as uncertain if the first determined value for the first data field does not match the second determined value for the first data field.

In still another embodiment, a system for verifying translation of text to a machine-readable format may include a memory. The memory may be configured to store a first data value associated with a first data field, a second data value associated with a second data field and a formula defining a relationship between the first data field and the second data field. The system may include a processor configured to mark the first data field and the second data field as not uncertain, apply the formula to the first data value and the second data value for determining whether the formula evaluates as true or not true, mark the first data field as unverified and the second data field as unverified if the formula evaluates as not true, calculate a determined value for the first data field using the formula if the first data field is marked as unverified and if the first data field is marked as not uncertain and mark the first data field as uncertain if the determined value for the first data field does not match a previous determined value for the first data field.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 3A is a sample document undergoing a verification and correction process of an optical character recognition verification and correction system according to an embodiment of the present invention;

FIG. 4C is a depiction of an unmatched one-to-one formula of a verification and correction process for an optical character recognition verification and correction system according to an embodiment of the present invention; and FIG. 4D is a depiction of an unmatched one-to-many formula of a verification and correction process for an optical character recognition verification and correction system according to an embodiment of the present invention.

DETAILED DESCRIPTION

Figure 1:
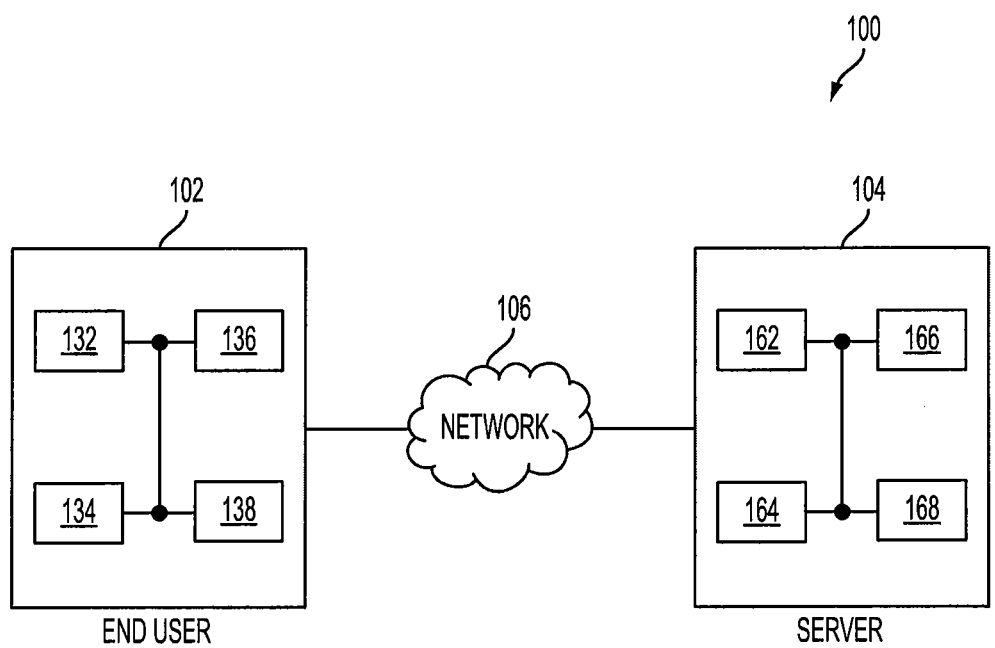
FIG. 1 is a system diagram of an optical character recognition verification and correction system utilizing a network interface between an end user device and a server device according to an embodiment of the present invention.

Referring first to FIG. 1, a system diagram of an optical character recognition ("OCR") verification and correction system 100 is shown. The OCR verification and correction system 100 includes an end user device 102 and a server 104. The end user device 102 is configured to communicate with the server 104 via a network 106 (e.g., the Internet, a private network, a public network, etc.). The end user device 102 and the server 104 may thus be distinctly located from each and configured to interface remotely via the network 106. An alternative embodiment may include the end user device 102 and the server 104 located at the same location and/or integrated into a same physical device. In still another embodiment, no server 104 or network 106 may be necessary, the end user device 102 being configured to perform all the operational steps or processes of the OCR verification and correction system 100 locally without external communication.

The end user device 102 may be a computing device (e.g., a personal computer, mobile computer, etc.) that includes a processor 132, a memory 134, a network interface 136 and an input/output ("I/O") interface 138. The network interface 136 operates to allow the end user device 102 to communicate with a remote system (e.g., the server 104) via the network 106 by any of a variety of networking protocols (e.g., TCP/IP). A user or operator of the end user device 102 may interface or manipulate with various components of the end user device via the I/O interface 138.

Similarly, the server 104 may be a computing device that includes a processor 162, a memory 164, a network interface 166 and an OCR module 168. In one embodiment, the OCR module 168 in conjunction with the processor 162 may interpret or otherwise convert typography of a paper or physical document into a scanned, electronic file with data values of a machine-readable format. Such data values generated via the OCR conversion may be stored in the memory 164 of the server 104. Logical steps or other information for performing verification and/or correction calculations may be stored in the memory 164. In one embodiment, the processor 162 may utilize the logical steps or correction calculations to verify and/or correct any determined errors in conversion of typography of the paper or physical document into the machine-readable format (e.g., the interpretation by the OCR module 140). Similar to the end user device 102, the network interface 166 of the server 104 allows the server 104 to communicate with a remote system (e.g., the end user device 102) via the network 106 by any of a variety of networking protocols.

The above-described structure for the OCR verification and correction system 100 is merely one embodiment showcasing how certain features of the present invention may be implemented using a variety of components. However, any of a number of alternative configurations is possible in alternative embodiments. For example, certain data may be stored in the memory 134 of the end user device 102 and/or in the memory 164 of the server 104. Certain features of the server 104 may be performed at the user device 102 (e.g., a personal computing device may be configured to achieve the functionality of the end user device 102 and the server 104. Alternatively, the server 104 may be integrated at a single location while communicating with the user device 102 of a network (e.g., the Internet). With the above structure described, attention will now be turned to functionality of an OCR verification and correction system.

Figure 2:
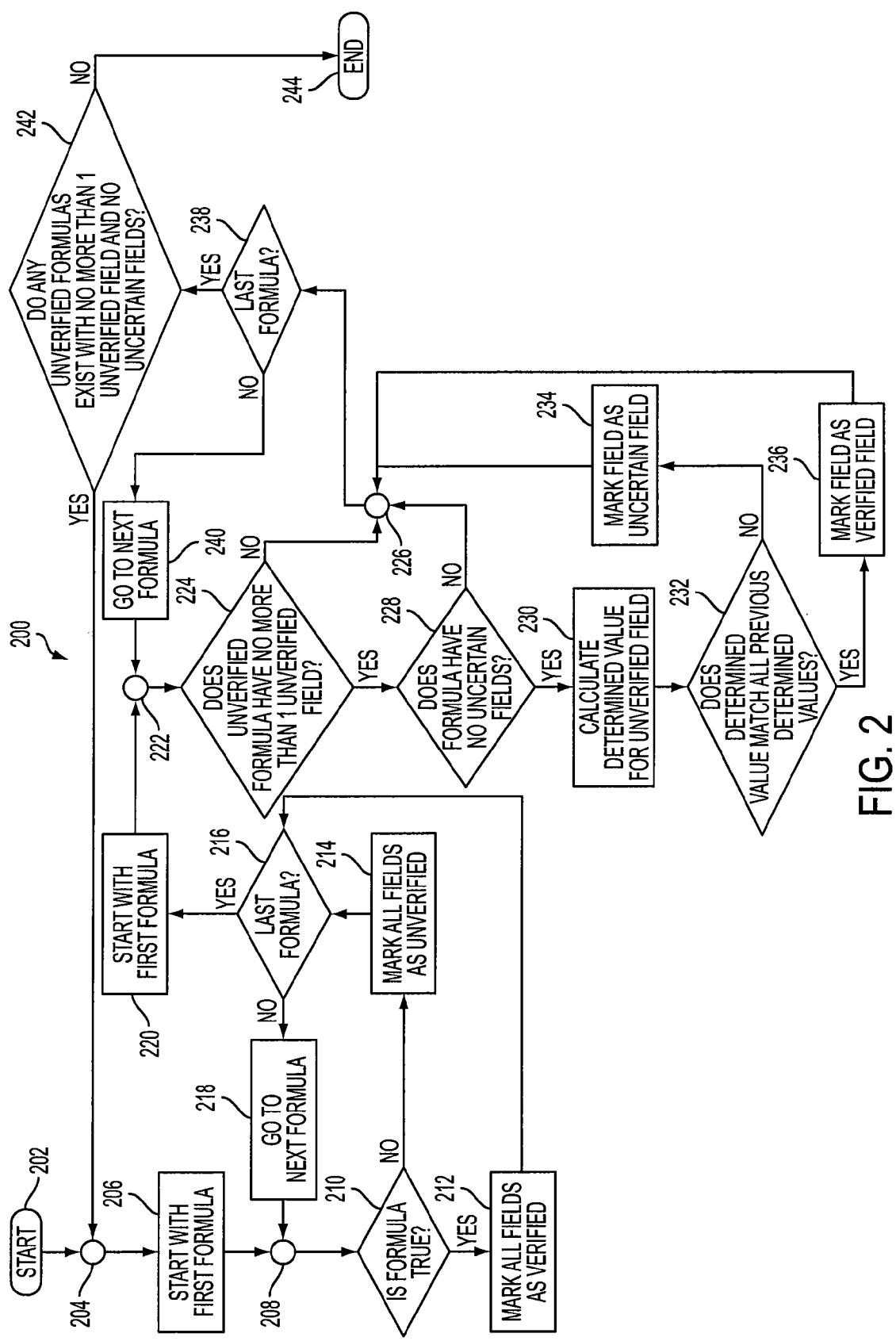
FIG. 2 is a flowchart of an optical character recognition verification and correction system according to an embodiment of the present invention.

FIG. 2 shows a flowchart for the functional operation of an OCR verification and correction system 200. The OCR verification and correction system 200 may be the same or similar to the OCR verification and correction system 100 previously described. The OCR verification and correction system 200 utilizes a process configured to determine if any errors exist in an electronic document having data values associated with various data fields. The data values may be generated or created via scanning of a paper or physical document via OCR. In an alternative embodiment, the data values may be generated or created by any of a variety of computerized or automatically-determined machine-readable text. The process of the OCR verification and correction system 200 is configured to correct such errors and/or verify the accuracy of the electronic document based upon one or more predetermined rules or formulas, as discussed in greater detail herein.

At step 202, the process begins, for example, when a user interfaces with an I/O interface of an end user device to transmit an electronic document generated via OCR to a server or other computer with a processor for verification and/or correction purposes. The electronic document may contain a plurality of data fields, each data field having an associated data value. Each of the associated data values may have been generated or determined by OCR and thus may be desirably tested by the OCR verification and correction system 200 for accuracy. For example, the electronic document may be a scanned tax form having a plurality of data fields, each plurality of data fields corresponding or relating to a line item on a tax form with a corresponding OCR code. A numerical or other data value associated with each of the data fields represents the information written or otherwise corresponding to the line item of the tax form. Step 204 is an intermediate step to allow certain portions of the process to repeat, as discussed in greater detail herein. After step 204, operation continues to step 206.

At step 206, a first formula or rule for the process is selected by a processor of the OCR verification and correction system 200 for evaluation. The first formula may be stored in a memory of the OCR verification and correction system 200 and defines a predetermined verification relationship between two or more of the plurality of data fields of the electronic document or amongst electronic documents, as discussed in greater detail herein. By storing a formula (e.g. a mathematical relationship) relating two or more of the plurality of data fields (e.g., tax form line items), the accuracy of data values generated via OCR and associated with each of the data fields used in the formula relationship may be tested. In one embodiment, the memory for storing the plurality of formulas or rules may be included as part of a server. A processor of the server communicates with the memory to retrieve the first formula or rule for subsequent evaluation. Step 208 is an intermediate step to allow certain portions of the process to repeat, similar to step 204 and as discussed in greater detail herein. After step 208, operation continues to step 210.

At step 210, the formula or rule selected in step 206 is evaluated to determine whether it is satisfied (i.e., is true) or is not satisfied (i.e., is not true). Each of the data values associated with the data fields of the formula are input or applied to the formula. If the formula is satisfied, operation continues to step 212. If the formula is not satisfied, operation continues to step 214. At step 212, each of the data fields of the formula are marked, set or otherwise flagged as verified data fields. Similarly, at step 214, each of the data fields of the formula are marked, set or otherwise flagged as unverified data fields. Thus, when the data values of the data fields of a formula result in a true evaluation, each of the data fields used in the formula are proven to be verified based on the data values associated therewith. When all of the data fields of a formula are marked, set or otherwise flagged as verified, such formula may be referred to as a verified formula. Likewise, when the data values of the data fields of a formula result in a false evaluation, the data fields are not proven to be verified based on the data values associated therewith and one or more of the data fields may require future evaluation and correction. When not all of the data fields of a formula are marked, set or otherwise flagged as verified, such formula may be referred to as an unverified formula. The marking, setting or flagging of the data fields may be accomplished by one or more bits having either a "0" state or a "1" state depending upon the evaluation of the formula in step 210. Both step 212 and step 214 continue operation to step 216.

At step 216, it is determined whether the previously evaluated formula in step 210 was the last or final formula stored in memory of the OCR verification and correction system 200 for evaluation per step 210. If it was the last formula, operation continues to step 220. If it was not the last formula, operation continues to step 218. At step 218, similar to step 206, a next formula or rule for the process is selected by the processor of the OCR verification and correction system 200 for evaluation. This next formula, like the first formula, may be stored in a memory of the OCR verification and correction system 200 and defines a different predetermined verification relationship between two or more of the plurality of data fields of the electronic document or amongst electronic documents. Any number of formulas or rules may be utilized for an embodiment of the OCR verification and correction system 200. The data fields may be the same or different from those data fields used in previously evaluated formulas. Operation thus continues according to the process loop including steps 208, 210, 212, 214, 216 and/or 218 until all of the stored formulas or rules of the OCR verification and correction system 200 have been evaluated. Therefore, upon continuing to step 220, all of the data fields used in all of the formulas or rules will have been marked, set or otherwise flagged as either verified or unverified.

At step 220, the first formula or rule is again selected by the processor of the OCR verification and correction system 200 for further evaluation. Step 222 is an intermediate step to allow certain portions of the process to repeat, similar to step 204 and as discussed in greater detail herein. After step 222, operation continues to step 224. At step 224, the processor determines whether the formula or rule selected in step 220 is an unverified formula (i.e. a formula where not all of the data fields used in the formula are marked as verified) that incorporates no more than one data field marked as unverified. If the formula is verified or has more than one unverified data field (i.e. has two or more unverified data fields), then operation continues to step 226. If the formula does not have more than one unverified data field (i.e. has only one unverified data field), then operation continues to step 228.

For example, if the selected formula contained a first data field, a second data field and a third data field, each of the first, second and third data fields marked as unverified, then the determination of step 224 is false and operation continues to step 226. If, however, only one of the first, second or third data fields is marked as unverified, then the determination of step 224 is true and operation continues to step 228. Such a situation may occur when a particular data field is utilized in multiple formulas, as discussed in greater detail herein. Step 226 is an intermediate step to allow certain portions of the process to repeat, similar to step 204 and as discussed in greater detail herein.

At step 228, the processor determines whether the formula or rule selected in step 220 incorporates any data fields marked, set or otherwise flagged as uncertain. Data fields may be so marked based upon a mismatch in a calculated or determined value, discussed below for subsequent step 232. In certain embodiments, each of the data fields used in the plurality of formulas or rules may be initialized (e.g., at step 202) such that they are marked, set or otherwise flagged as not uncertain. If the selected formula or rule has any data fields marked as uncertain, then operation continues to step 226, previously described above. However, if the selected formula or rule does not have any data fields marked as uncertain, then operation continues to step 230.

At step 230, the processor calculates a determined value for the data field marked as unverified (see step 204 above) in the selected formula or rule. The determined value is a value for the unverified data field that would be required in order for the formula to become a verified formula. Since step 230 is only reached if the selected formula or rule has no more than one unverified data field, the formula can be solved for the unverified data field in order to determine an appropriate data value based upon the data values of the remaining data fields. For example, if a selected formula is defined by a relationship wherein an unverified first data field should equal a verified second data field, the determined value may be calculated to equal the data value associated with the second data field. Upon calculation or other determination of the determined value for the unverified field, operation continues to step 232.

At step 232, the processor compares the determined value for the unverified data field as calculated in step 230 against all other previous determined values for the same data field. For example, the unverified data field may be utilized in a plurality of different formulas, such that a determined value for the unverified data field may be calculated according to more than one of the plurality of different formulas and possibly generating differing answers. The memory of the OCR verification and correction system 200 may store and associate each of the determined values calculated for a particular data field. If the processor determines that the determined value calculated in step 230 matches with all previous determined values calculated for that data field (e.g., via step 230 during prior iterations of the process of the OCR verification and correction system 200), then operation continues to step 236. However, if the processor determines that the determined value calculated in step 230 does not match with all previous determined values calculated for the data field, then operation continues to step 234.

In step 234, the data field is marked, set or otherwise flagged as uncertain due to a mismatch or ambiguity in determined values calculated for the same data field but according to different formulas. This marking is in addition to the marking as verified or unverified. An uncertain data field represents a field with two or more determined values that do not equal each other. After marking the data field as uncertain, operation continues to step 226, previously described above. In step 236, the data field is marked, set or otherwise flagged as verified due to the satisfaction of the selected formula (see step 220) when using the determined value for the unverified field. Operation then continues to step 226, previously described above. After step 226, operation continues to step 238.

At step 238, similar to step 216, it is determined whether the previously selected formula in step 220 was the last or final formula stored in memory for the process of the OCR verification and correction system 200. If it was the last formula, operation continues to step 242. If it was not the last formula, operation continues to step 240. At step 240, similar to step 218, a next formula or rule for the process is selected by the processor of the OCR verification and correction system 200 for further evaluation. Operation thus continues according to the process loop including steps 222, 224, 226, 228, 230, 232, 234, 236, 238 and/or 240 until all of the stored formulas or rules of the OCR verification and correction system 200 have been further evaluated.

At step 242, the processor determines whether any of the previously evaluated formulas stored as part of the OCR verification and correction system 200 exist as unverified formulas with no more than one unverified field and no uncertain fields, similar to the previous discussion for steps 224 and 228. If any such formulas exist, then operation continues back to step 204 where the entire process previously described can be repeated. Thus, the process will continue to repeat until no unverified formulas exist with no more than one unverified field and no uncertain fields. If no such formulas exist, then operation continues to step 244 where the process ends and the OCR verification and correction system 200 has completed checking the various data field values.

For example, the verification and correction system 200 may follow the below described progression as an illustration for three formulas stored in memory. The first formula may define a relationship such that A+B=C, where A, B and C are data fields having associated data values. The second formula may define a relationship such that B=D, where D is a data field having an associated data value. The third formula may define a relationship such that E=D, where E is a data field having an associated data value. Thus, according to steps 210 and 214, if the first formula does not evaluate as true, then data fields A, B and C will be marked as unverified. Next, according to steps 216, 218, 210 and 214, if the second formula does not evaluate as true, then data field B will remain marked as unverified and data field D will also be marked as unverified. Subsequently, according to steps 216, 218, 210 and 212, if the third formula is does evaluate as true, then data field D will be updated and marked as verified and data field E will also be marked as verified. Since only three formulas are stored in memory for this example, the process now continues to step 220.

According to step 224, the first formula is an unverified formula, but has more than one unverified field (data fields A, B and C are all unverified fields) so operation continues to step 238 and 240. Next, according to step 224, the second formula is also an unverified formula, but does have only one unverified field (data field B is unverified and data field D is verified) so operation continues to step 228. Neither data field B nor data field D has been previously marked as uncertain so operation continues to step 230. According to step 230, the second formula is solved for the single unverified field (i.e. data field B). According to step 232 and 236, since there have not been any previous determined values for data field B to cause a mismatch, data field B is marked as verified and operation continues to step 238 and 240. Subsequently, according to step 224, the third formula is a verified formula (both field D and E are verified) so operation continues to step 238. Since the third formula was the last stored formula, operation continues to step 242 wherein the process repeats by again evaluating the first formula per step 210. However, upon this iteration, the first formula may evaluate as true in light of the updated data value calculated and determined for data field B.

The various steps described for the OCR verification and correction system 200 may be performed or processed in a different order than as explicitly shown in FIG. 2. In addition, certain steps of the OCR verification and correction system 200 may be omitted or reconfigured or new steps may be added in an alternative embodiment. Those of ordinary skill in the art would appreciate that various logical steps or methods, either alone or combined, could be utilized given the disclosures contained within.

Moreover, those of ordinary skill would also appreciate that the various illustrative logical blocks, modules, and algorithm steps described in connection with the examples disclosed herein may be implemented as electronic hardware, computer software, or combinations of both. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Turning next to FIG. 3A, a verification process 300 of an OCR verification and correction system is shown for a sample document 302. The verification process 300 may contain the same or similar aspects as the OCR verification and correction systems previously described. The sample document 302 is a representation of at least a portion of a physical tax form (e.g., a Form 1040) that includes a number of line items 303 (e.g., line items 7, 8A, 9A, 13, 15, 17, 18, 19, 20 and 21) with associated information to be scanned and identified as data fields with data values upon electronic translation. The sample document 302 also includes a line item 304 (e.g., line item 22) with associated information to be scanned and identified as a data field with a data value upon electronic translation. The items (303, 304) may have been handwritten, typed, or otherwise printed upon the sample document 302. The verification process 300 seeks to verify accuracy when the line items (303, 304) of the sample document 302 are converted or otherwise translated into machine-readable text, for example during an OCR process.

The OCR-read amounts of the sample document 302 are shown beneath the sample document 302. As can be seen, the data fields (e.g., corresponding to line items 7, 8A, 9A, 13, 15, 17, 18, 19, 20, 21 and 22) have associated or corresponding data values 305 generated via OCR during electronic translation of the sample document 302. While many of the data values 305 match the information of the line items (303, 304) of the sample document 302, the data value for line item 8A was misread during the OCR process as "200" instead of "800." Thus, an error in translating the sample document 302 to machine-readable text has occurred.

The verification process 300 of the OCR verification and correction system is configured to determine or otherwise identify when such inaccuracies exist, for example, according to a process the same or similar to the previous description for FIG. 2. A first formula 301 of the verification process 300 is stored in a memory of the OCR verification and correction system and defines a relationship for various data fields generated from the sample document 302. The first formula 301 establishes that the addition of data values associated with data fields corresponding to the information of line items 303 should equal the data value associated with the data field corresponding to the information of line item 304.

In the sample document 302, this information appropriately sums to satisfy the formula 301. However, during the verification process 300 for checking the OCR generated data, the data values 305 do not truthfully evaluate 306 and thus fail 307 to satisfy the first formula 301 due to the error in translating the data value for line 8A. Due to such failure 307, each data field used in the first formula 301 is marked, set or otherwise flagged 308 as "Unverified," the same as or similar to the process steps (210, 214) previously described for FIG. 2. This process may then repeat (see, for example, step 216 of FIG. 2) for each formula stored in the memory of the OCR verification and correction system, as discussed in greater detail below.

Figure 3B:
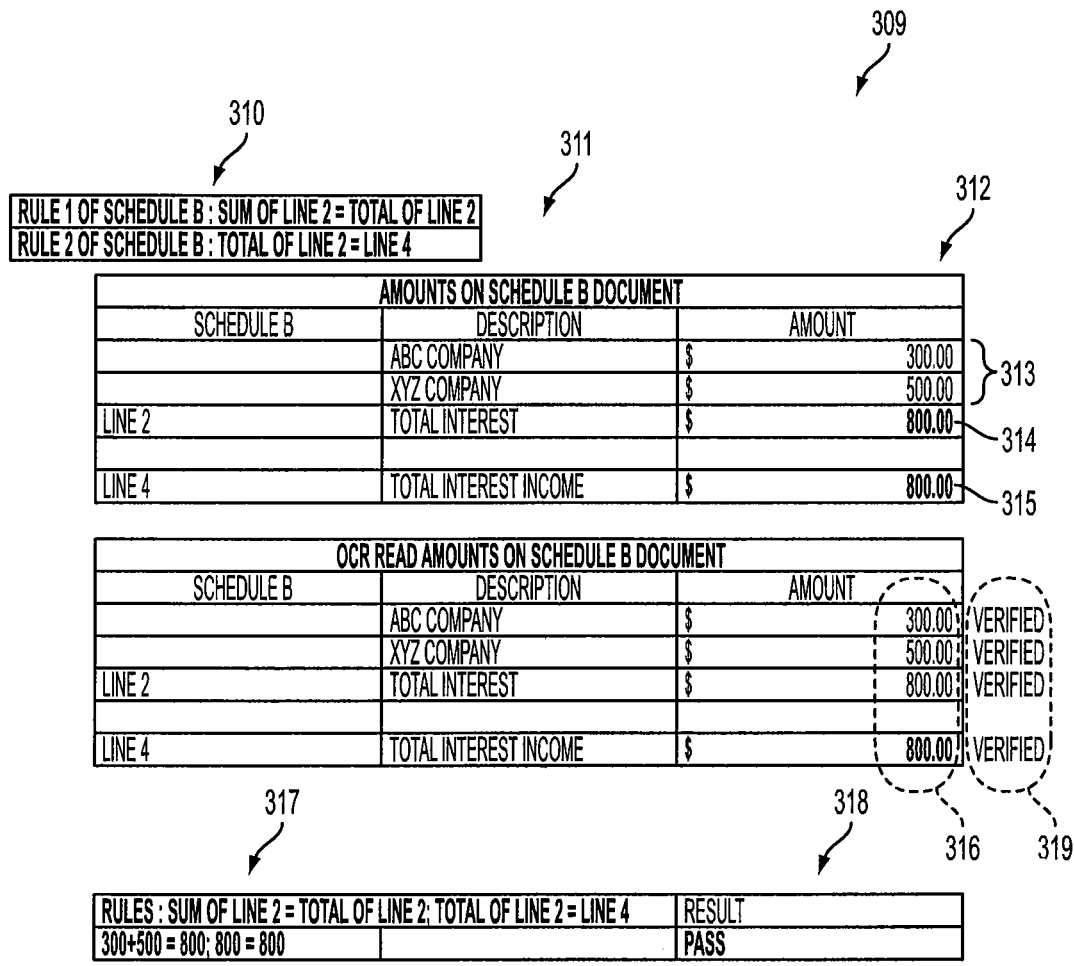
FIG. 3B is a sample document undergoing a verification and correction process of an optical character recognition verification and correction system according to an embodiment of the present invention.

FIG. 3B shows a verification process 309 of the OCR verification and correction system for a sample document 312. The verification process 309 may occur subsequent to the verification process 300 as the OCR verification and correction system iterates through a plurality of stored formulas. The verification process 309 may contain the same or similar aspects as the OCR verification and correction systems previously described. The sample document 312 is a representation of at least a portion of a physical tax form (e.g., a Form Schedule B) and includes a number of line items (313, 314) (e.g., line item 2) containing information associated therewith for translation into corresponding data fields having data values. The sample document 312 also includes a line item 315 (e.g., line item 4) containing information associated therewith for translation into a corresponding data field having a data value. The information of the line items (313, 314, 315) may have been handwritten, typed, or otherwise printed upon the sample document 312. The verification process 309 seeks to verify accuracy when the information of the line items (313, 314, 315) of the sample document 312 are converted or otherwise translated into machine-readable text, for example during an OCR process.

Similar to FIG. 3A, the OCR read amounts of the sample document 312 are shown beneath the sample document 312. As can be seen, data fields (e.g., lines 2, 4) have associated or corresponding data values 316, the data values 316 generated via OCR. As shown, all of the generated data values 316 match the information of the line items (313, 314, 315) of the sample document 312 and thus no errors in translating the sample document 312 to machine-readable text has occurred. The verification process 309 of the OCR verification and correction system is configured to determine or otherwise identify if any inaccuracies exist and a second formula 310 and a third formula 311 are stored in a memory of the OCR verification and correction system for defining a relationship between various data fields of the sample document 312. The second formula 310 establishes that the addition of data values associated with data fields corresponding to line items 313 should equal the data value associated with the data field corresponding to line item 314. The third formula 311 establishes that the data value associated with the data field corresponding to line item 314 should equal the data value associated with the data field corresponding to line item 315. In certain embodiments, the second formula 310 and the third formula 311 may be combined into one formula (e.g., a formula defined to equate the sum of line items 313 to the line item 315).

During the verification process 309 for checking the OCR generated data, the data values 316 truthfully evaluate 317 and thus pass 318 to satisfy the second formula 310 and the third formula 311. Due to such passage 318 of the second formula 310 and the third formula 311, each data field used in the second formula 310 and the third formula 311 is marked, set or otherwise flagged 319 as "Verified," the same as or similar to the process steps (210, 212) previously described for FIG. 2. This process may then repeat (see, for example, step 216 of FIG. 2) until each formula stored in the memory of the OCR verification and correction system is evaluated and its corresponding data fields flagged.

Figure 3C:
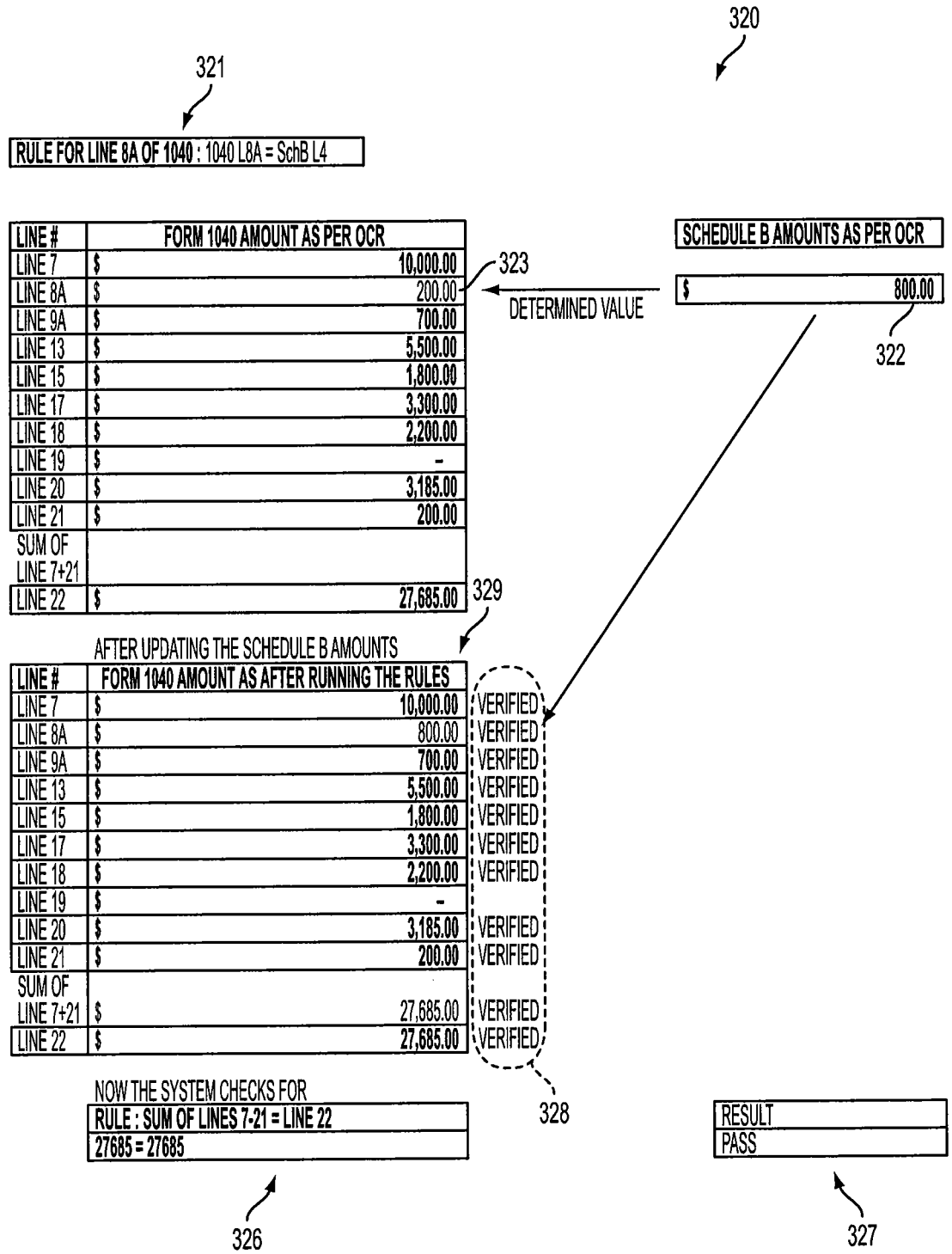
FIG. 3C is a sample document undergoing a verification and correction process of an optical character recognition verification and correction system according to an embodiment of the present invention.

FIG. 3C shows a verification process 320 of the OCR verification and correction system. The correction process 320 may occur subsequent to the verification processes 300 and 309 of the OCR verification and correction system and may contain the same or similar aspects as the OCR verification and correction systems previously described. As discussed above for FIGS. 3A and 3B, the data field Line 8A for the sample document 302, along with the other data fields associated with the first formula 301, has been flagged as unverified, but the data field Line 4 for the sample document 312 has been flagged as verified. The OCR verification and correction system may utilize a fourth formula 321 for defining a relationship such that the data field Line 8A for the sample document 302 equals the data field Line 4 for the sample document 312.

The verification process 320 may calculate a determined value for an unverified data field based on determining whether a particular formula has no more than one unverified field (see, for example, step 224 of FIG. 2). If the fourth formula 321 has only one unverified field (e.g., data field Line 8A) when making such a determination, the verification process 320 calculates a determined value for the unverified field based on the remaining verified fields of the fourth formula 321 (e.g., data field Line 4). Therefore, the data value 322 (e.g., "800") for the verified data field is determined to replace the data value 323 for the unverified data field. Thus, upon subsequent evaluation 326 (see, for example, step 242 of FIG. 2) of the first formula 301, the data fields of the first formula 301 will be marked, set or flagged 328 as "Verified" since the OCR verification and correction system has properly detected and corrected the original error in OCR translation such that the data values appropriately sum 326 and thus pass or satisfy 327 the first formula 301.

Figure 4A:
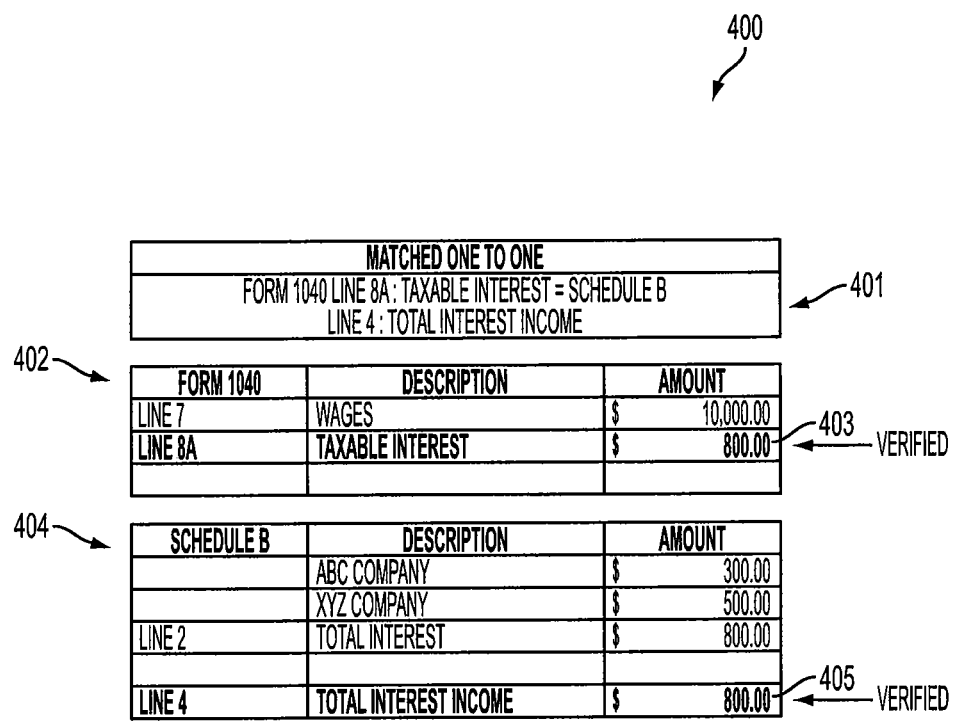
FIG. 4A is a depiction of a matched one-to-one formula of a verification and correction process for an optical character recognition verification and correction system according to an embodiment of the present invention.
Figure 4B:
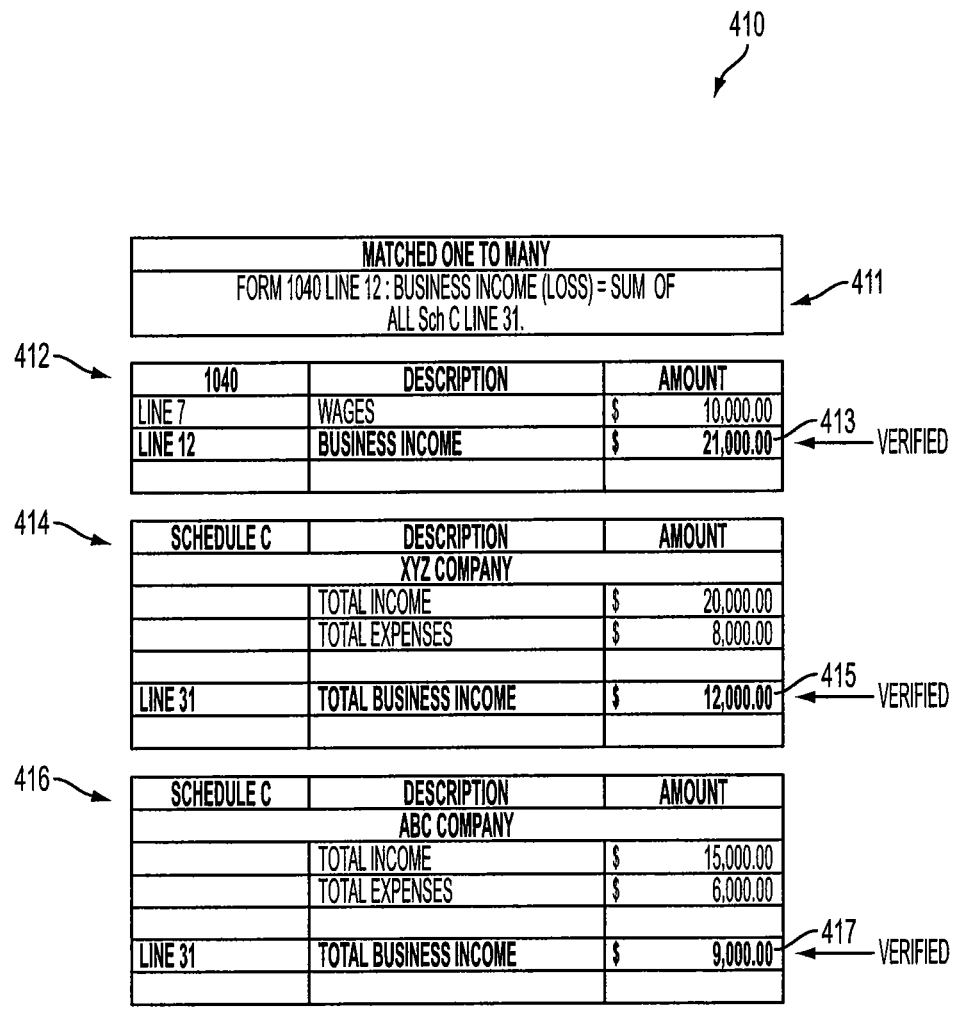
FIG. 4B is a depiction of a matched one-to-many formula of a verification and correction process for an optical character recognition verification and correction system according to an embodiment of the present invention.

Various formulas or rules may be defined or employed for the purposes of verifying and/or correcting data values for data fields of one or more documents. FIGS. 4A-4B depict examples of various formula types that may be employed in certain embodiments of an OCR correction and verification system or process. FIG. 4A depicts a verification process 400 for an optical character recognition verification and correction system utilizing one such formula 401. The formula 401 defines a matched one-to-one relationship between a data field 403 of a first document 402 and a data field 405 of a second document 404. Formula 401 is thus a simple equality relationship between two different data fields (403, 405) of two different documents. As shown, since the data values of the corresponding data fields (403, 405) match, the formula 401 is satisfied and the data fields (403, 405) are marked, set or otherwise flagged as verified upon evaluation of the formula 401 during the verification process 400. Although two documents (402, 404) are identified in FIG. 4A, alternative embodiments may establish a matched one-to-one relationship between data fields of a same document and according to any of a variety of mathematical or other relationships.

FIG. 4B depicts a verification process 410 for an optical character recognition verification and correction system utilizing a formula 411 defining a matched one-to-many relationship between a data field 413 of a first document 412, a data field 415 of a second document 414 and a data field 417 of a third document 416. The formula 411 is a summation relationship wherein the second and third data fields (415, 417) of the two different documents (414, 416) equal the first data field 413 of the first document 412 when added together. As shown, since the data values of the corresponding data fields (413, 415, 417) satisfy the formula 411, the data fields (413, 415, 417) are marked, set or otherwise flagged as verified upon evaluation of the formula 401 during the verification process 410. Although three documents (412, 414, 415) are identified in FIG. 4B, alternative embodiments may establish a matched one-to-many relationship between data fields of any number of documents and according to any of a variety of mathematical or other relationships.

FIG. 4C depicts a verification process 420 for an optical character recognition verification and correction system utilizing a formula 421 defining an unmatched one-to-one relationship. The formula 421 provides that a data field 423 of a first document 422 has a relationship with a data field 425 of a second document 424 or a data field 427 of a third document 426 or a data field 429 of a fourth document 428. The formula 421 also provides that the second document 424, the third document 426 or the fourth document 428 may have a relationship with other documents different from the first document 422 (e.g., a Schedule E or a Schedule F document, as shown). Thus, the verification process 420 must determine if the formula 421 is satisfied amongst a variety of possible documents with potential one-to-one relationships with one another. As shown in FIG. 4C, for this example, since the data value of the corresponding data field 423 of the first document 422 matches with the data value of the corresponding data field 427 of the third document 426, the formula 421 is satisfied for the first document 422 and the third document 426. Accordingly, the data fields (423, 427) are marked, set or otherwise flagged as verified upon evaluation of the formula 421 during the verification process 420. The remaining data fields (425, 429) of the second and fourth documents (424, 428) are not marked, set or otherwise flagged because they are not deemed to be included as part of the data fields of the formula 421 after the above evaluation. Although four documents (422, 424, 426, 428) are identified in FIG. 4C, alternative embodiments may establish an unmatched one-to-one relationship between data fields of any of a number of documents and according to any of a variety of mathematical or other relationships.

FIG. 4D depicts a verification process 430 for an optical character recognition verification and correction system utilizing a formula 431 defining an unmatched one-to-many relationship. The formula 431 provides that a data field 433 of a first document 432 or a data field 435 of a second document 434 has an additive relationship with some combination of a data field 437 of a third document 436, a data field 439 of a fourth document 438 and/or a data field 441 of a fifth document 440. Thus, the verification process 430 must determine if the formula 431 is satisfied and for which particular documents (432, 434, 436, 438, 440). As shown, since the data value of the corresponding data field 433 for the first document 432 matches with the summation of the data value of the corresponding data field 437 of the third document 436 and the data value of the corresponding data field 439 of the fourth document 438, the formula 431 is satisfied in a first case for the first document 432, the third document 436 and the fourth document 438. Accordingly, the data fields (433, 437, 439) are marked, set or otherwise flagged as verified for the first case upon evaluation of the formula 431 during the verification process 430.

In addition and as shown, since the data value of the corresponding data field 435 for the second document 434 matches (e.g., comprises a sum with no other values) with the data value of the corresponding data field 441 of the fifth document 440, the formula 431 is also satisfied in a second case for the second document 434 and the fifth document 440. Accordingly, the data fields (435, 441) are marked, set or otherwise flagged as verified for the second case upon evaluation of the formula 431 during the verification process 430. Although five documents (432, 434, 436, 438, 440) are identified in FIG. 4D, alternative embodiments may establish an unmatched one-to-many relationship between data fields of any number of documents and according to any of a variety of mathematical or other relationships.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for verifying machine-readable data using a processor and a memory, the method comprising the steps of:
   storing a first data value in the memory, the first data value associated with a first data field;
   storing a second data value in the memory, the second data value associated with a second data field;
   marking, using the processor, the first data field and the second data field as not uncertain;
   storing a formula in the memory, the formula defining a relationship between the first data field and the second data field;
   applying, using the processor, the formula to the first data value and the second data value for determining whether the formula evaluates as true or not true;
   marking, using the processor, the first data field as unverified and the second data field as unverified if the formula evaluates as not true;
   calculating, using the processor, a determined value for the first data field using the formula if the first data field is marked as unverified and if the first data field is marked as not uncertain; and
   marking, using the processor, the first data field as uncertain if the determined value for the first data field does not match a previous determined value for the first data field.

2. The method of claim 1 wherein the relationship of the formula comprises an equation with at least the first data field on one side and at least the second data field on the other side.

3. The method of claim 2 wherein the step of calculating the determined value for the first data field using the formula occurs only if the second data field is marked as verified and the second data field is marked as not uncertain.

4. The method of claim 1 further comprising the step of marking, using the processor, the first data field and the second data field as verified if the formula evaluates as true.

5. The method of claim 1 further comprising the steps of:
   storing a third data value in the memory, the third data value associated with a third data field;
   storing a second formula in the memory, the second formula defining a relationship between the first data field and the third data field;
   applying, using the processor, the first data value and the third data value to the second formula for determining whether the second formula evaluates as true or not true;
   marking, using the processor, the first data field as unverified and the third data field as unverified if the second formula evaluates as not true;
   calculating, using the processor, a second determined value for the first data field using the second formula if the first data field is marked as unverified and if the first data field is marked as not uncertain; and
   marking, using the processor, the first data field as uncertain if the second determined value for the first data field does not match the determined value for the first data field.

6. The method of claim 1 wherein the first data field corresponds to a first document scanned using optical character recognition and the second data field corresponds to a second document scanned using optical character recognition.

7. The method of claim 6 wherein the relationship defined by the formula relates the first data field to only the second data field.

8. The method of claim 6 further comprising a third data field corresponding to a third document scanned using optical character recognition and wherein the relationship defined by the formula relates the first data field to a summation of the second data field with the third data field.

9. The method of claim 6 further comprising a third data field corresponding to a third document scanned using optical character recognition and wherein the relationship defined by the formula relates the first data field to the second data field or to the third data field.

10. The method of claim 6 further comprising a third data field corresponding to a third document scanned using optical character recognition, a fourth data field corresponding to a fourth document scanned using optical character recognition and wherein the relationship defined by the formula relates the first data field to any combination of the second data field, the third data field or the fourth data field.

11. The method of claim 1 further comprising the step of repeating the applying, using the processor, the formula to the first data value and the second data value for determining whether the formula evaluates as true or not true and the marking, using the processor, the first data field as unverified and the second data field as unverified if the formula evaluates as not true based on either the first data field or the second data field being marked as unverified.

12. The method of claim 11 wherein the step of repeating the applying, using the processor, the formula to the first data value and the second data value for determining whether the formula evaluates as true or not true and the marking, using the processor, the first data field as unverified and the second data field as unverified if the formula evaluates as not true is based on both the first data field and the second data field being marked as not uncertain.

13. A method for verifying optical character recognition data using a processor, the method comprising the steps of:
- receiving, at the processor, a data value corresponding to a first data field, the data value of the first data field generated via optical character recognition;
- receiving, at the processor, a data value corresponding to a second data field, the data value of the second data field generated via optical character recognition;
- receiving, at the processor, a data value corresponding to a third data field, the data value of the third data field generated via optical character recognition;
- setting, using the processor, the first data field, the second data field and the third data field as not uncertain;
- defining a first rule for relating the first data field to the second data field;
- defining a second rule for relating the first data field to the third data field;
- determining, using the processor, if the first rule is true based on the data value corresponding to the first data field and the data value corresponding to the second data field;
- setting, using the processor, the first data field and the second data field as verified if the first rule is true or as unverified if the first rule is not true;
- determining, using the processor, if the second rule is true based on the data value corresponding to the first data field and the data value corresponding to the third data field;
- setting, using the processor, the first data field and the third data field as verified if the second rule is true or as unverified if the second rule is not true;
- calculating, using the processor, a first determined value for the first data field based on the first rule if the first data field is set as unverified, the second data field is set as verified and the first data field and the second data field are set as not uncertain;
- calculating, using the processor, a second determined value for the first data field based on the second rule if the first data field is set as unverified, the third data field is set as verified and the first data field and the third data field are set as not uncertain; and
- setting, using the processor, the first data field as uncertain if the first determined value for the first data field does not match the second determined value for the first data field.

14. The method of claim 13 wherein the first data field corresponds to a first document, the second data field corresponds to a second document and the third data field corresponds to a third document.

15. The method of claim 13 wherein the first rule relates the first data field to only the second data field.

16. The method of claim 15 wherein the second rule relates the first data field to only the third data field.

17. A system for verifying translation of text to a machine-readable format comprising:
- a memory configured to store
  - a first data value associated with a first data field,
  - a second data value associated with a second data field and
  - a formula defining a relationship between the first data field and the second data field; and
- a processor configured to
  - mark the first data field and the second data field as not uncertain,
  - apply the formula to the first data value and the second data value for determining whether the formula evaluates as true or not true,
  - mark the first data field as unverified and the second data field as unverified when the formula evaluates as not true,
  - calculate a determined value for the first data field using the formula when the first data field is marked as unverified and when the first data field is marked as not uncertain and
  - mark the first data field as uncertain when the determined value for the first data field does not match a previous determined value for the first data field.

18. The system of claim 17 wherein the processor is configured to mark both the first data field and the second data field as verified when the formula evaluates as true.

19. The system of claim 18 wherein the processor is configured to calculate the determined value for the first data field using the formula only when the first data field is marked as unverified, the second data field is marked as verified and both the first data field and the second data field are marked as not uncertain.

20. The system of claim 17 wherein:
- the memory is further configured to store
  - a third data value associated with a third data field,
  - a second formula defining a relationship between the first data field and the third data field; and
- the processor is further configured to
  - apply the second formula to the first data value and the third data value for determining whether the second formula evaluates as true or not true,
  - mark the first data field as unverified and the third data field as unverified when the second formula evaluates as not true,
  - calculate a second determined value for the first data field using the second formula when the first data field is marked as unverified and when the first data field is marked as not uncertain and
  - mark the first data field as uncertain when the second determined value for the first data field does not match the determined value for the first data field.

* * * * *